(12) United States Patent
Lavin et al.

(10) Patent No.: US 12,072,427 B2
(45) Date of Patent: Aug. 27, 2024

(54) ANTENNAS FOR PRODUCING A VARIABLE PHASE RESPONSE, ANGLE-OF-ARRIVAL SENSORS AND METHODS FOR DETERMINING ANGLE OF ARRIVAL

(71) Applicant: The Boeing Company, Chicago, IL (US)

(72) Inventors: Ronald O. Lavin, Gilbert, AZ (US); Andy H. Lee, Phoenix, AZ (US)

(73) Assignee: The Boeing Company, Arlington, VA (US)

( * ) Notice: Subject to any disclaimer, the term of this patent is extended or adjusted under 35 U.S.C. 154(b) by 360 days.

(21) Appl. No.: 17/554,072

(22) Filed: Dec. 17, 2021

(65) Prior Publication Data

US 2023/0194644 A1    Jun. 22, 2023

(51) Int. Cl.
*G01S 3/00*     (2006.01)
*G01S 3/04*     (2006.01)
*H01Q 1/36*     (2006.01)
*H01Q 21/20*    (2006.01)

(52) U.S. Cl.
CPC ............ *G01S 3/043* (2013.01); *H01Q 1/36* (2013.01); *H01Q 21/205* (2013.01)

(58) Field of Classification Search
CPC ....... G01S 3/0043; H01Q 1/36; H01Q 21/205

USPC .......................................................... 342/442
See application file for complete search history.

(56) References Cited

U.S. PATENT DOCUMENTS

2020/0403302 A1    12/2020    Lavin et al.

FOREIGN PATENT DOCUMENTS

| CN | 101931124 | A | * | 12/2010 | | |
| CN | 206274548 | U | * | 6/2017 | | |
| CN | 107069190 | A | * | 8/2017 | ............... | H01Q 1/36 |
| EP | 4290688 | A1 | * | 12/2023 | ............... | H01Q 1/36 |
| RU | 2756432 | C2 | * | 9/2021 | ............. | H01Q 1/282 |

* cited by examiner

*Primary Examiner* — Harry K Liu
(74) *Attorney, Agent, or Firm* — Walters & Wasylyna LLC

(57) ABSTRACT

An antenna includes antenna structure configured to receive electromagnetic radiation and including an antenna geometry. The antenna geometry is configured to cause a variable phase shift in the electromagnetic radiation based on an angular position of a direction of propagation of the electromagnetic radiation relative to azimuth. An angle-of-arrival sensor includes the antenna configured to the receive electromagnetic radiation and to produce a phase-shift signal. A method for determining an angle of arrival of electromagnetic radiation uses the angle-of-arrival sensor.

20 Claims, 14 Drawing Sheets

ANTENNAS FOR PRODUCING A VARIABLE PHASE RESPONSE, ANGLE-OF-ARRIVAL SENSORS AND METHODS FOR DETERMINING ANGLE OF ARRIVAL

FIELD

The present disclosure relates generally to antennas and, more particularly, to antennas for producing a variable phase response, angle-of-arrival sensors using the antennas and methods for determining angle of arrival using the antennas.

BACKGROUND

In various applications, electromagnetic waves are used for long range communication and direction finding. In some instances, it may be desirable to detect an angle of arrival to determine a direction from which electromagnetic waves are propagating. Conventional direction-finding systems typically use an array of antennas to receive incoming electromagnetic waves and to determine the direction of arrival based on a phase difference of the received signal between the various antennas. For example, on aircraft, many direction-finding systems utilize antennas mounted on different quadrants of the airframe. However, such direction-finding systems may be large and increase the weight and/or drag of the aircraft. Additionally, conventional direction-finding systems may lack a desired degree of direction-finding accuracy. Accordingly, those skilled in the art continue with research and development efforts in the field of direction-finding systems.

SUMMARY

Disclosed are examples of an antenna, an angle-of-arrival sensor, and a method for determining an angle of arrival of electromagnetic radiation. The following is a non-exhaustive list of examples, which may or may not be claimed, of the subject matter according to the present disclosure.

In an example, the disclosed antenna includes an antenna structure configured to receive electromagnetic radiation and includes an antenna geometry. The antenna geometry is configured to cause a variable phase shift in the electromagnetic radiation based on an angular position of a direction of propagation of the electromagnetic radiation relative to azimuth.

In an example, the angle-of-arrival sensor includes an antenna configured to receive electromagnetic radiation and produce a phase-shift signal. The antenna includes an antenna structure that is configured to cause a variable phase shift in the electromagnetic radiation according to a mathematical logarithmic spiral based on an angular position of a direction of propagation of the electromagnetic radiation relative to azimuth. The angle-of-arrival sensor also includes a second antenna configured to receive the electromagnetic radiation and to produce a phase-reference signal. The angle-of-arrival sensor further includes a receiver configured to receive the phase-shift signal and the phase-reference signal. The angle-of-arrival sensor additionally includes a processor configured to determine an angle of arrival of the electromagnetic radiation based on a comparison of the phase-shift signal and phase-reference signal.

In an example, the disclosed method includes steps of: (1) receiving electromagnetic radiation by an antenna; (2) causing a unique phase shift in the electromagnetic radiation according to a mathematical logarithmic spiral based on an angular position of a direction of propagation of the electromagnetic radiation relative to azimuth using a configuration of an antenna structure of the antenna; (3) receiving the electromagnetic radiation by a second antenna; (4) producing a phase-shift signal from the antenna 100; (5) producing a phase-reference signal from the second antenna; (6) comparing the phase-shift signal and the phase-reference signal; and (7) determining the angle of arrival of the electromagnetic radiation based on a comparison of the phase-shift signal and the phase-reference signal.

Other examples of the disclosed antenna, angle-of-arrival sensor, and method will become apparent from the following detailed description, the accompanying drawings, and the appended claims.

DETAILED DESCRIPTION

Figure 1:
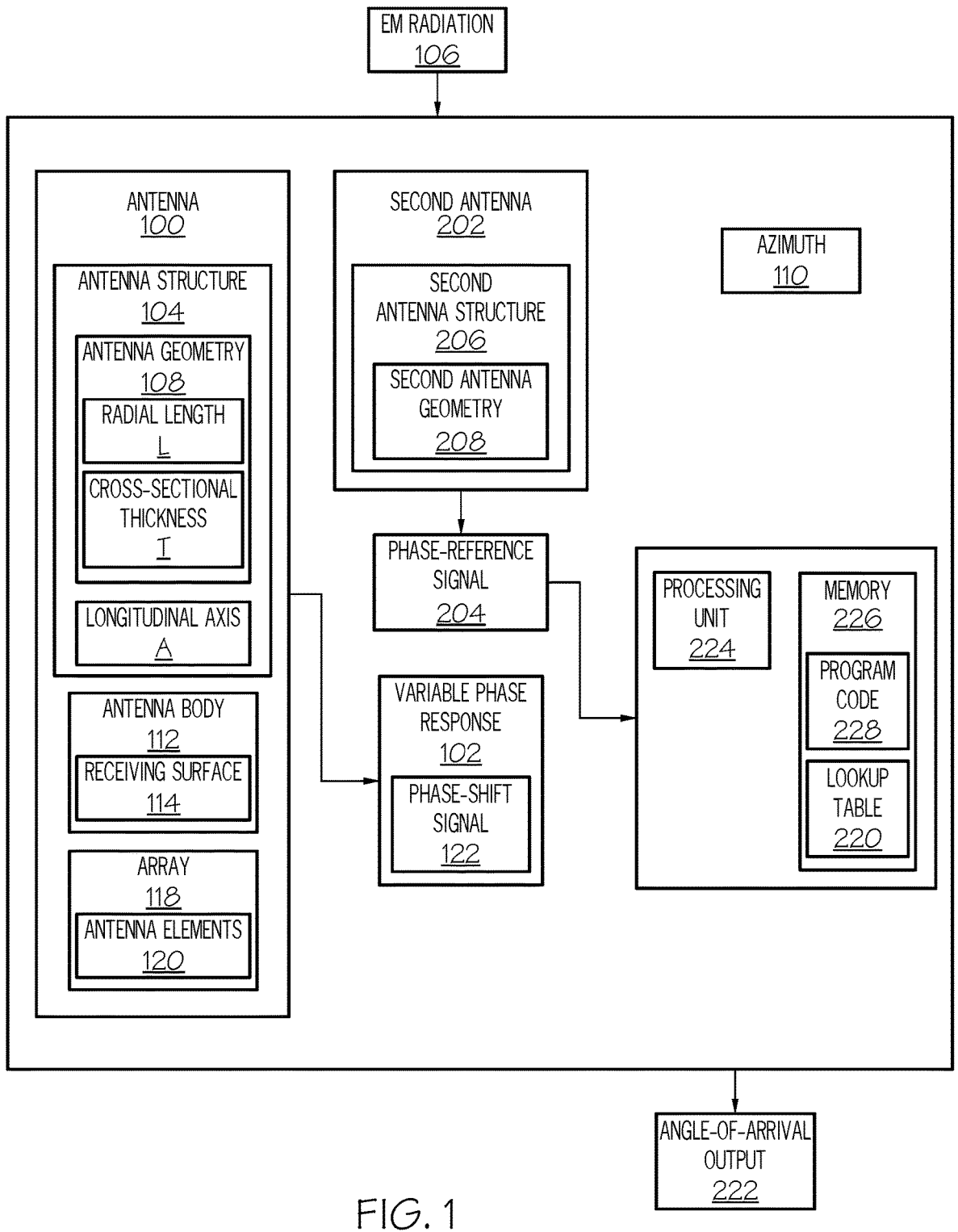
FIG. 1 is a schematic block diagram of an example of an angle-of-arrival sensor.

Referring generally to FIGS. 1-9, by way of examples, the present disclosure is directed to an antenna 100 that is configured to produce a variable phase response 102. In one or more examples, the antenna 100 is configured to cause (e.g., introduces) a variable phase shift in electromagnetic ("EM") radiation 106 according to an angular position of a direction of propagation of the electromagnetic radiation 106 relative to azimuth 110. As an example, the antenna 100 is configured to cause the variable phase shift in the electromagnetic radiation 106 according to a mathematical logarithmic spiral, which is based on or corresponds to the angular position of the direction of propagation (e.g., direction of arrival) of the electromagnetic radiation 106 relative to azimuth 110. In other words, the antenna 100 induces an angular-based phase shift, or phase offset, in an output signal relative to an input signal from the electromagnetic radiation 106 received by the antenna 100 (e.g., the variable phase response 102). The phase shift, or phase offset, is unique at different angular positions relative to azimuth 110 and can be determined (e.g., calculated) according to the mathematical logarithmic spiral.

In one or more examples, the variable, angular-based phase shift is physically induced by a structural geometry of the antenna 100. In one or more examples, the variable, angular-based phase shift is electronically produced by the antenna 100.

Generally, the antenna 100 may be used to selectively affect an incoming electromagnetic (e.g., radio) signal of specific (e.g., desired) angles of arrival. In a practical application, the antenna 100 may be used to detect an angle-of-arrival of an incoming electromagnetic signal by inducing a unique phase shift at different angles of arrival. For example, the antenna 100 may form a portion of a direction-finding system or angle-of-arrival sensor (e.g., angle-of-arrival sensor 200 as shown in FIG. 1).

In another practical application, the antenna 100 may be used to correct for phase differences when such phase differences are due to different angles of arrival. In one or more examples, the antenna 100 has a unique geometric structure that provides a variable phase when compared against a reference antenna (e.g., a second antenna 202 as shown in FIGS. 1 and 10-13). The phase difference can provide, but is not limited to, calculable distance information for collision avoidance applications, assistance in discriminating surface orientations within remote sensing applications, and the like.

In another practical application, the antenna 100 may be used to correct for angle-of-arrival differences. In one or more examples, angle-of-arrival differences can provide methods for tracking surrounding targets in civilian and/or military airborne applications and provide a method of alignment in landing or other in-flight path correction applications.

Examples of the antenna 100 beneficially provide unique, angular-based phase shifting of an incoming electromagnetic signal using simple components and having no moving parts. Additionally, the phase-shifted signal can be processed using conventional signal processing techniques and systems.

Referring now to FIG. 1, in one or more examples, the antenna 100 includes an antenna structure 104. The antenna structure 104 is configured to receive the electromagnetic radiation 106 (e.g., electromagnetic signal, waves, or energy). The antenna structure 104 includes an antenna geometry 108. The antenna geometry 108 is configured to cause the variable phase shift in the electromagnetic radiation 106 based on the angular position of the direction of propagation of the electromagnetic radiation 106 relative to azimuth 110.

In one or more examples, the antenna geometry 108 produces the variable phase shift by positioning different portions of the antenna 100 relative to azimuth 110 such that the different portions of the antenna 100 induce the unique, angular-based phase shift according to the mathematical logarithmic spiral. Accordingly, a unique phase shift is induced at different angular positions of the direction of propagation of the electromagnetic radiation 106.

In one or more examples, the antenna geometry 108 of the antenna structure 104 is non-cylindrical. In one or more examples, the antenna geometry 108 is radial in shape. In one or more examples, the antenna geometry 108 has a radial length L.

In one or more examples, the antenna geometry 108 includes a cross-sectional thickness T. In one or more examples, the cross-sectional thickness T of the antenna geometry 108 varies in thickness along the radial length L of the antenna geometry 108 and causes the unique phase shift that varies based on the angular position of the direction of propagation of the electromagnetic radiation 106 relative to azimuth 110. For example, the cross-sectional thickness T of the antenna geometry 108 varies based on the angle.

In one or more examples, the cross-sectional thickness T of the antenna geometry 108 progressively increases along the radial length L of the antenna geometry 108. In one or more examples, the cross-sectional thickness T of the antenna geometry 108 has at least one portion or section along the radial length L of the antenna geometry 108 that is thicker than at least another portion of section along the radial length L of the antenna geometry 108.

For the purpose of the present disclosure, the terms "variable," varies," and like terms in reference to a measurable characteristic refer to instances in which the measurable characteristic has at least a first value and at least a second value and the first value and the second value are different (e.g., in size, amount or degree).

In one or more examples, the antenna geometry 108 is a spiral. The spiral geometry is represented by curve that emanates from a point and that moves radially farther away from the point as the curve revolves around the point. In one or more examples, the antenna geometry 108 is a logarithmic spiral (e.g., the spiral is a logarithmic spiral). The logarithmic spiral geometry is represented by a self-similar spiral curve that that emanates from a point and that moves radially farther away from the point as the curve revolves around the point in which the distances between the turnings increase in geometric progression.

Figure 2:
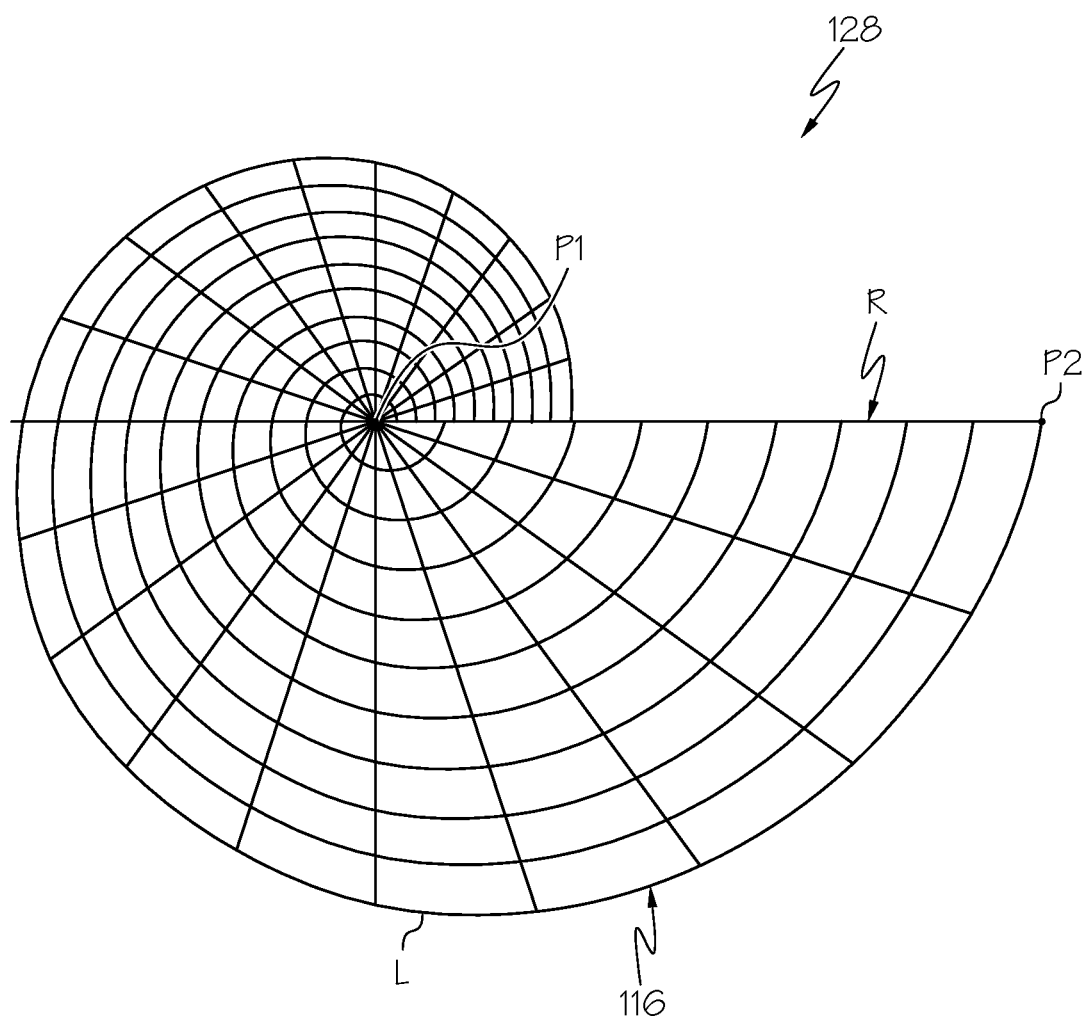
FIG. 2 is a graphical illustration of an example of a logarithmic spiral.

FIG. 2 illustrates an example of a logarithmic spiral 128. In polar coordinates, the radius "R" of the logarithmic spiral 128 is represented by $R=e^{a\theta}$, in which "e" is the base of natural logarithms, "a" is a growth factor (e.g., constant), and "$\theta$" is the polar angle that ranges from 0-degrees to 360-degrees. In the illustrated example, the radial length L is the length of a radially expanding spiral curve 116 that emanates from point P1 and that moves radially farther away from point P1 as the curve revolves around point P1 to point P2, in which the radius R of the curve increase in geometric progression according to the mathematical logarithmic spiral.

In one or more examples, the antenna structure 104 is positioned along the radially expanding spiral curve 116 such that the antenna 100 induces a progressive phase shift that is phased according to the radius R.

Figure 3:
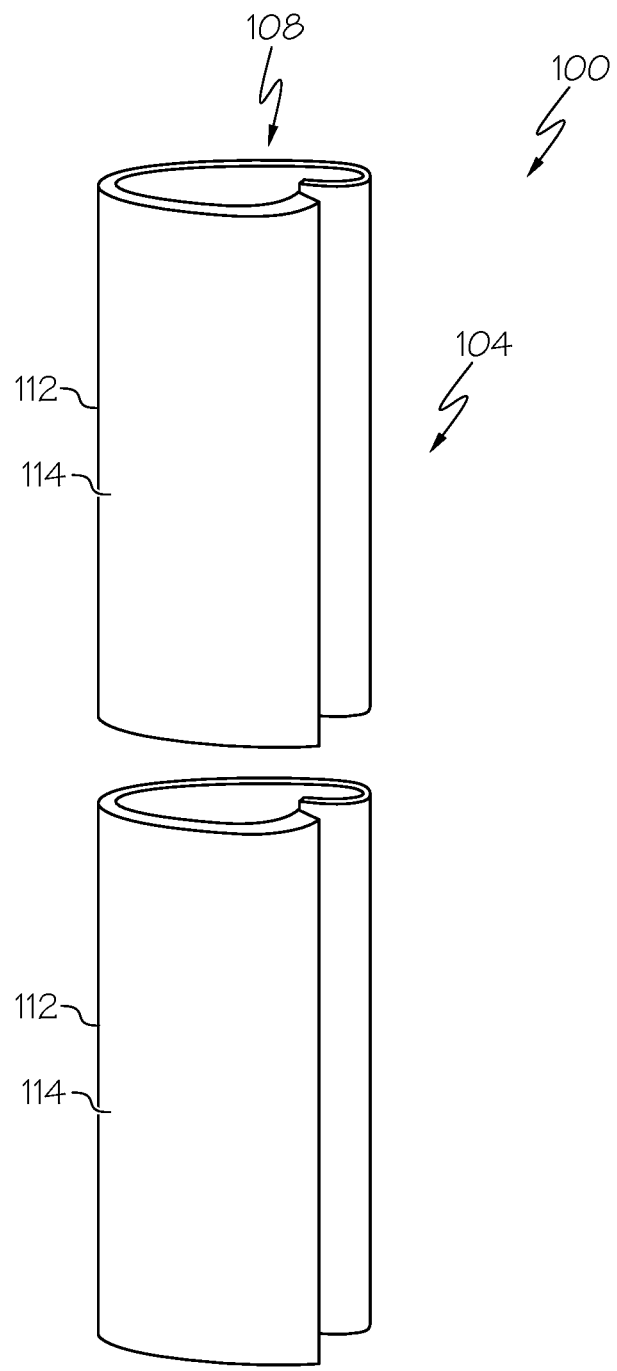
FIG. 3 is a schematic, perspective view of an example of an antenna.
Figure 4:
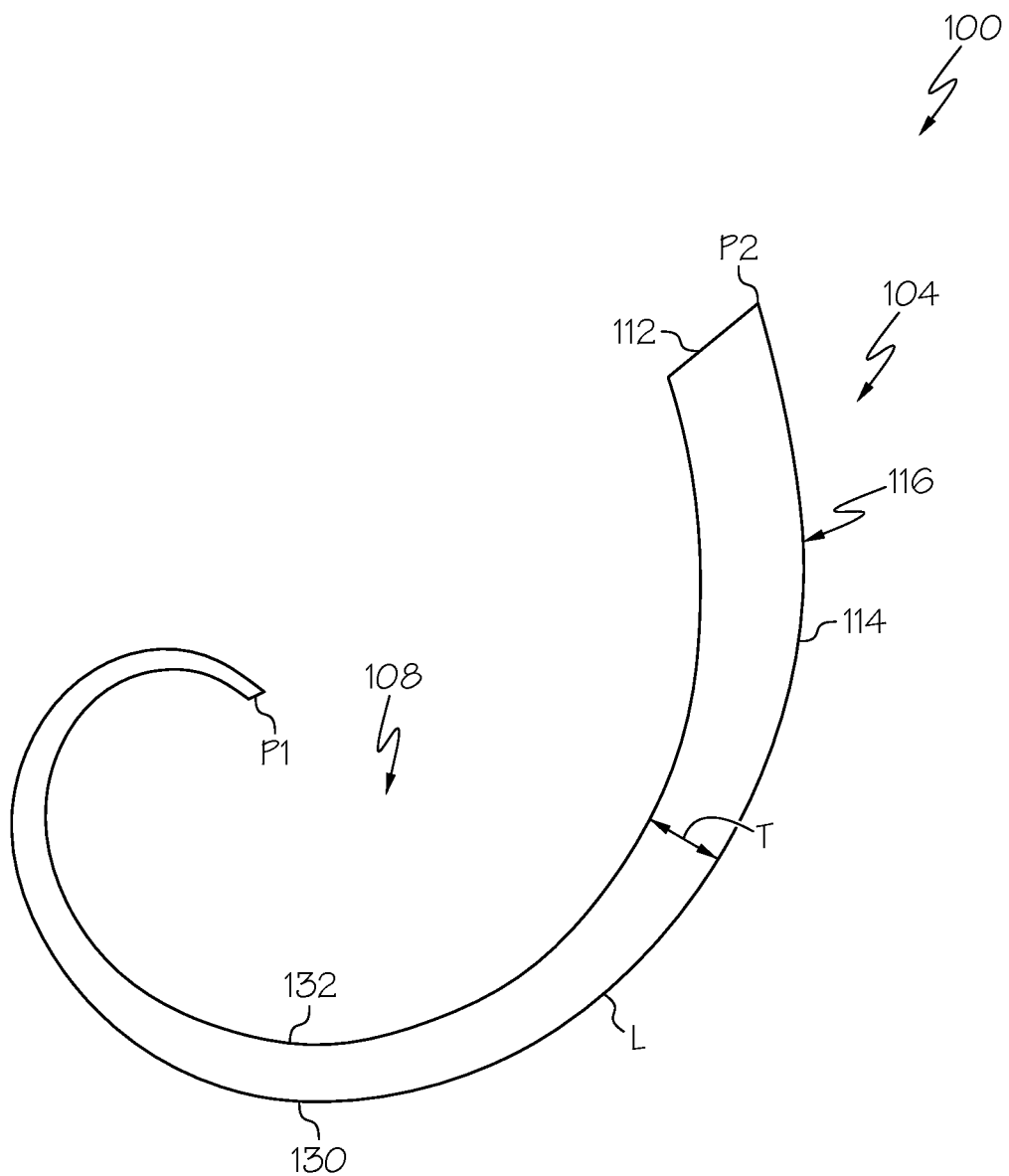
FIG. 4 is a schematic, end view of an example of the antenna.
Figure 5:
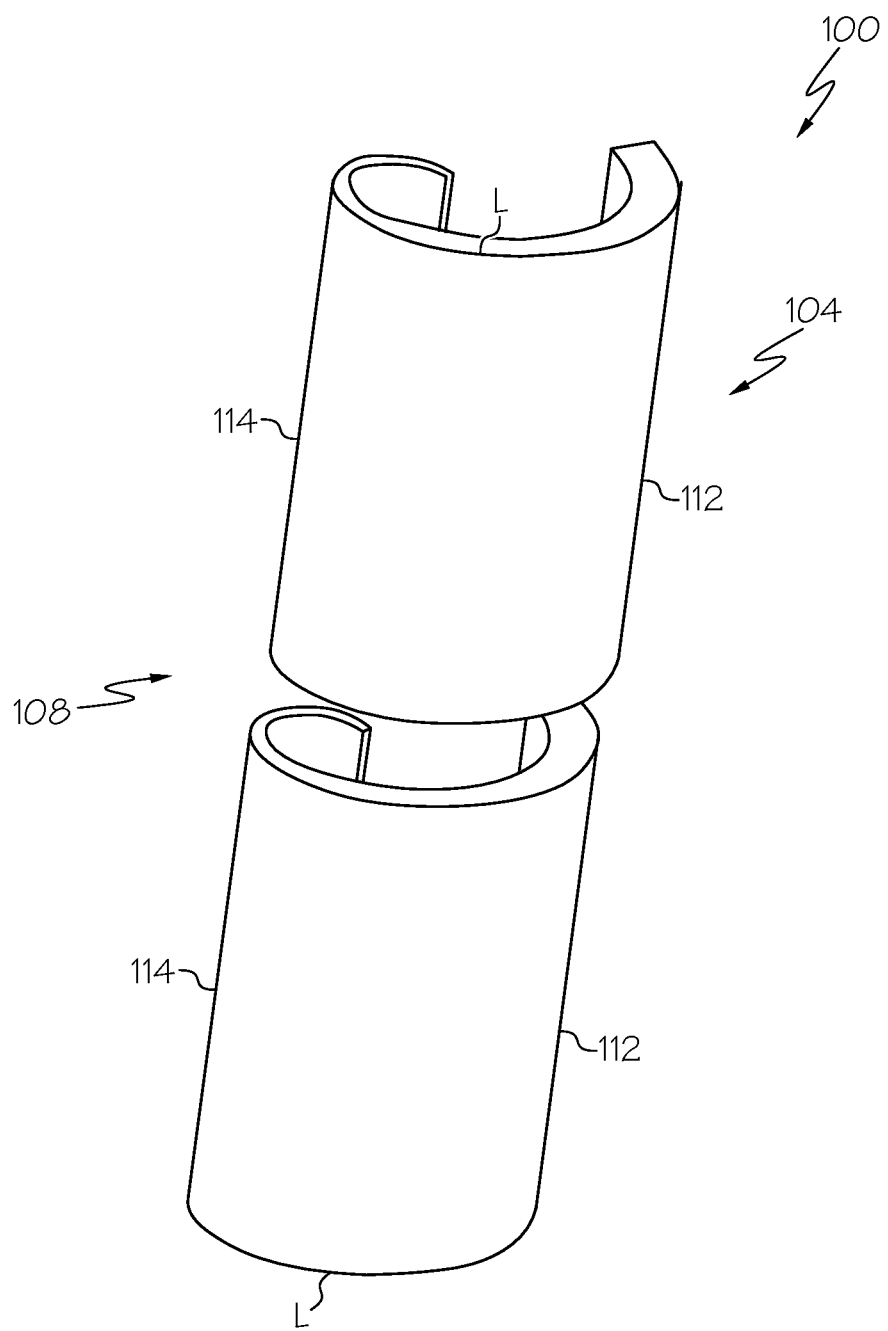
FIG. 5 is a schematic, perspective view of an example of the antenna.

FIGS. 3-5 illustrate an example of the antenna 100. In this example, the variable, angular-based phase shift is physically induced by the antenna geometry 108 of the antenna 100. For example, the antenna geometry 108 of the antenna structure 104 of the antenna 100 is configured to cause the unique phase shift that varies based on the angular position of the direction of propagation of the electromagnetic radiation 106 relative to azimuth 110.

In one or more examples, the antenna structure 104 includes an antenna body 112. The antenna body 112 includes a receiving surface 114.

In one or more examples, the receiving surface 114 forms the antenna geometry 108. In one or more examples, the receiving surface 114 (e.g., the antenna geometry 108) includes a shape of the radially expanding spiral curve 116. In one or more examples, the radially expanding spiral curve 116 is a logarithmic spiral (e.g., the logarithmic spiral 128 shown in FIG. 2).

In one or more examples, the receiving surface 114 is positioned along the radially expanding spiral curve 116 such that the antenna 100 induces a progressive phase shift that is phased according to the radius R of the radially expanding spiral curve 116 (e.g., the logarithmic spiral 128 shown in FIG. 2).

Generally, the receiving surface 114 of the antenna body 112 is the portion of the antenna 100 over which the electromagnetic radiation 106 (e.g., electromagnetic waves) passes to induce a small voltage (e.g., electric current) inside the antenna body 112, which becomes a signal source for a receiver. In one or more examples, the receiving surface 114 is an exterior or radially outward facing surface 130 of the antenna body 112 (e.g., as shown in FIG. 3). In one or more examples, the receiving surface 114 is an interior or a radially inward facing surface 132 of the antenna body 112.

In one or more examples, the receiving surface 114 has the radial length L (e.g., as shown in FIGS. 4 and 5). In one or more examples, the radial length L of the receiving surface 114 is equal to one wavelength of the electromagnetic radiation 106. However, in other examples, the radial length L of the receiving surface 114 may be less than or greater than one wavelength of the electromagnetic radiation 106.

In one or more examples, the antenna body 112 forms the antenna geometry 108. In one or more examples, the antenna body 112 (e.g., the antenna geometry 108) includes a shape of the radially expanding spiral curve 116. In one or more examples, the radially expanding spiral curve 116 is a logarithmic spiral (e.g., the logarithmic spiral 128 shown in FIG. 2).

In one or more examples, the antenna body 112 has the radial length L. In one or more examples, the radial length L of the antenna body 112 is equal to one wavelength of the electromagnetic radiation 106. However, in other examples, the radial length L of the antenna body 112 may be less than or greater than one wavelength of the electromagnetic radiation 106.

As such, the shape of the antenna body 112 and/or the receiving surface 114 being the radially expanding spiral curve 116 (e.g., the logarithmic spiral 128 shown in FIG. 2), the radial length L of the radially expanding spiral curve 116, and the radius R of the radially expanding spiral curve 116 provide geometric features than enable selective control of the angular-based phase shift induced by the antenna 100. As an example, the radial length L and the radius R provide "degrees of freedom" that facilitate phase-shift adjustment (e.g., a unique phase delta) at certain sectors of angles relative to azimuth 110.

In one or more examples, the antenna body 112 has the cross-sectional thickness T (e.g., as shown in FIG. 4). Generally, the cross-sectional thickness T of the antenna body 112 refers to the thickness of the antenna body 112 extending between and approximately perpendicular to the radially outward facing surface 130 and the radially inward facing surface 132 of the antenna body 112.

In one or more examples, the cross-sectional thickness T of the antenna body 112 varies along the radial length L. For example, the cross-sectional thickness T of the antenna body 112 varies based on the angle of the radially expanding spiral curve 116 formed by the antenna body 112.

In one or more examples, the cross-sectional thickness T of the antenna body 112 progressively or incrementally increases along the radial length L, for example, from point P1 to point P2. For example, the antenna body 112 includes a tapered shape that results from a gradual thickening of the antenna body 112 along a spiral of the antenna body 112.

In one or more examples, the antenna body 112 has at least a first cross-sectional thickness along at least one portion of the radial length L and at least a second cross-sectional thickness along at least another portion of the radial length L. The second cross-sectional thickness is greater than the first cross-sectional thickness. In one or more examples, the cross-sectional thickness T of the antenna body 112 may transition between regions having the first cross-sectional thickness and regions having the second cross-sectional thickness along the radial length L.

In one or more examples, the antenna body 112 may have a shape that includes a stepped pattern. For example, each step may have a predetermined width based on the angle of the radially expanding spiral curve 116 formed by the antenna body 112. In one or more examples, each step may have a different cross-sectional thickness T (e.g., angular width) than another step. For example, steps may narrow in some regions along the radial length L or the antenna body 112 and may thicken in other regions along the radial length L.

As such, the cross-sectional thickness T of the antenna body 112 provides another geometric feature than enable selective control of the angular-based phase shift induced by the antenna 100. As an example, the cross-sectional thickness T of the antenna body 112 provides another "degree of freedom" that facilitates a phase-shift adjustment (e.g., a unique phase delta) at certain sector of angles relative to azimuth 110.

As illustrated in FIGS. 3 and 5, in one or more examples, the antenna 100 (e.g., the antenna structure 104) is a dipole antenna. For example, an upper spiral portion of the antenna structure 104 forms one pole and a lower spiral portion of the antenna structure 104 forms the other pole. In one or more examples, the dipole antenna structure of the antenna 100 having the logarithmic spiral shape can be constructed or otherwise fabricated using a variety of machining or additive manufacturing techniques or methods.

Figure 6:
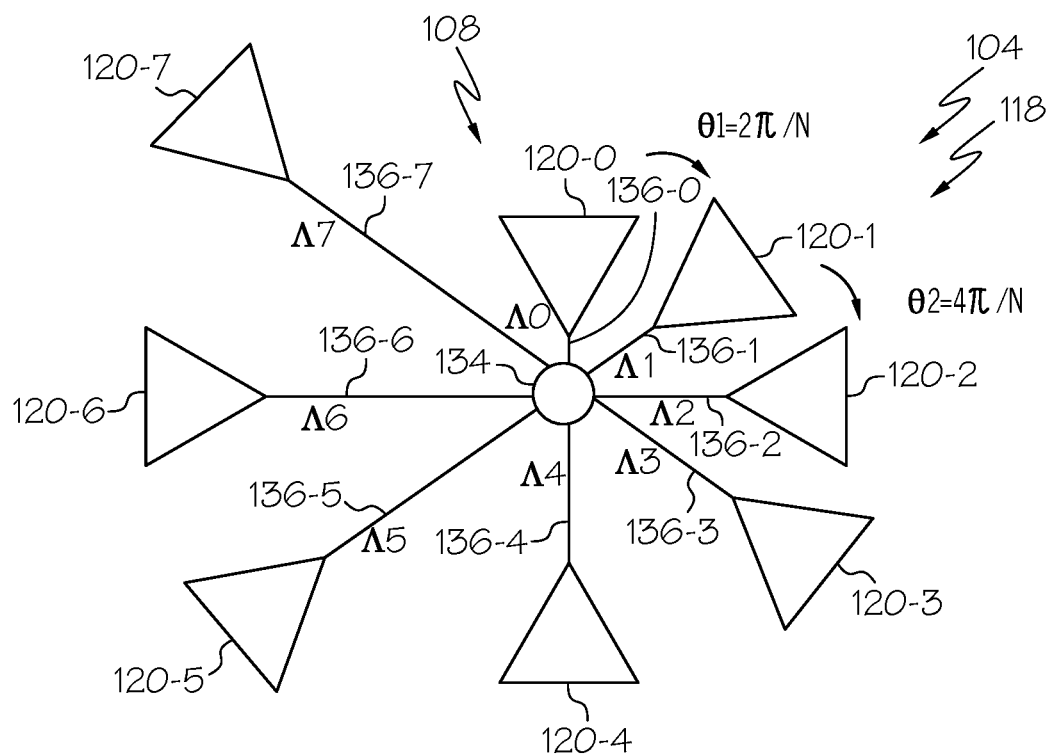
FIG. 6 is a schematic illustration of an example of the antenna.

FIG. 6 illustrates another example of the antenna 100. In this example, the variable, angular-based phase shift is physically induced by the antenna geometry 108 of the antenna 100. For example, the antenna geometry 108 of the antenna structure 104 of the antenna 100 is configured to cause the unique phase shift that varies based on the angular position of the direction of propagation of the electromagnetic radiation 106 relative to azimuth 110.

In one or more examples, the antenna structure 104 includes an array 118 of antenna elements 120. In the illustrated example, the array 118 includes eight (8) antenna elements 120, identified individually as first antenna element 120-0, second antenna element 120-1, third antenna element 120-2, fourth antenna element 120-3, fifth antenna element 120-4, sixth antenna element 120-5, seventh antenna element 120-6, and eighth antenna element 120-7. However, in other examples, the array 118 may include any number of antenna elements 102-$n$. For N number of antenna elements 120-$n$, the nth antenna element 120 is 0 to N−1.

The number N of antenna elements 120 of the array 118 may depend on various factors, such as, but not limited to, the radial length L of the radially expanding spiral curve 116 (e.g., the logarithmic spiral 128) of the antenna geometry 108, the wavelength of the electromagnetic radiation 106 being received by the antenna 100, the number of angles or sectors of angles relative to azimuth 110 desired for direction finding, and the like.

Generally, the greater number N of the antenna elements 120, the more precise the angle of arrival estimates (e.g., calculations) may be. In some examples, the number N of antenna elements 120 may be constrained based on size and/or weight constraints.

In one or more examples, the array 118 of the antenna elements 120 forms the antenna geometry 108. The antenna elements 120 are arranged in a shape of the radially expanding spiral curve 116 (e.g., the logarithmic spiral 128 shown in FIG. 2). For example, each one of the antenna elements 120 is positioned at a unique (e.g., progressively increasing) radial distance (e.g., radius R) from a common feedpoint 134 according to the logarithmic spiral.

In one or more examples, each one of the antenna elements 120 of the array 118 is positioned along the radially expanding spiral curve 116 such that the antenna 100 induces a progressive phase shift that is phased according to the radius R of the radially expanding spiral curve 116 (e.g., the logarithmic spiral 128 shown in FIG. 2).

In one or more examples, each one of the antenna elements 120 is angularly positioned at θn, where θ is the angular position of the antenna element 120-$n$ relative to azimuth 110. For example, the second antenna element 120-1 is angularly positioned at θ1, the third antenna element 120-2 is angularly positioned at θ2, etc., as shown in FIG. 6.

The position of each one of the antenna elements 120 is configured to induce a unique phase shift ϕn, where ϕ is the phase shift induced by the antenna element 120-$n$. ϕn is equal to 2nπ/N. For example, the second antenna element 120-1 induces a unique phase shift of 2π/N, the third antenna element 12-2 induces a unique phase shift of 4π/N, etc., as shown in FIG. 6.

In one or more examples, each one of the antenna elements 120 is coupled to and is in communication with the feedpoint 134 by an associated one of a plurality of feedlines 136. In the illustrated example, the eight (8) antenna elements 120 each have an associated feedline 136, identified individually as first feedline 136-0, second feedline 136-1, third feedline 136-2, fourth feedline 136-3, fifth feedline 136-4, sixth feedline 136-5, seventh feedline 136-6, and eighth feedline 136-7. However, in other examples, the array 118 may include any number of feedlines 136-$n$. For N number of feedlines 136-$n$, the nth feedline 136-$n$ is 0 to N−1.

In one or more examples, each one of the feedlines 136 has a line length λn, where λ is the length of the feedline 136. λn is equal to (2πi)*(1/frequency)*(ϕn/(2π)), where i is any positive integer, and the frequency is set to the center frequency of the intended band of operation.

As such, the unique phase shift induced by any one of the antenna elements 120 of the array 118 is created by the physical length of the feedline 136, the angular position of the antenna element 120, and the radial position of the antenna element 120.

Figure 7:
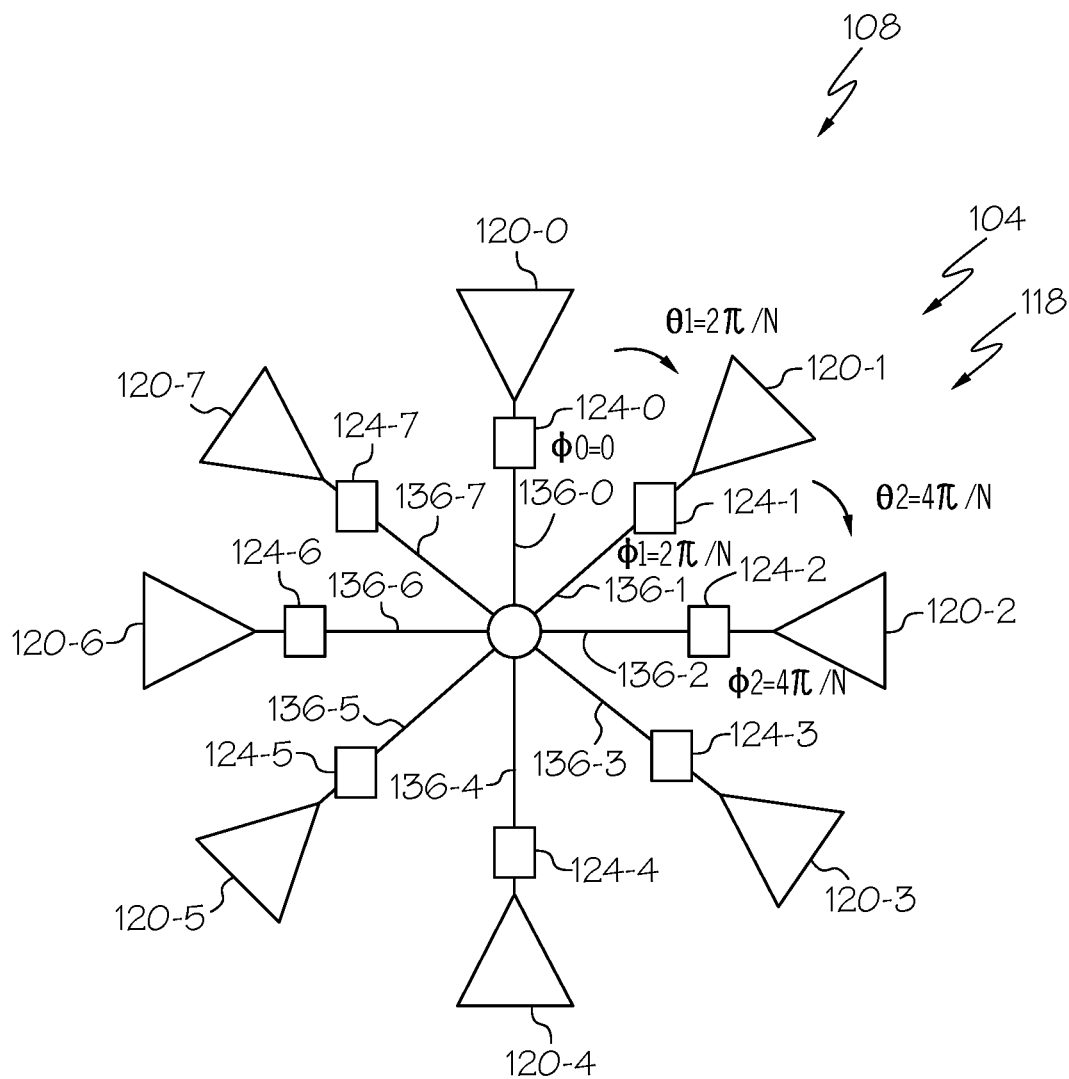
FIG. 7 is a schematic illustration of an example of the antenna.
Figure 8A:
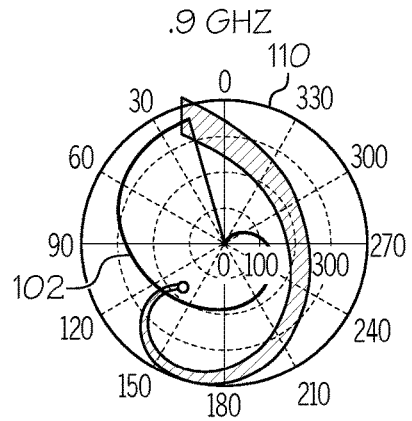
FIGS. 8A-8G illustrate examples of a phase response of the antenna at different frequencies.
Figure 8B:
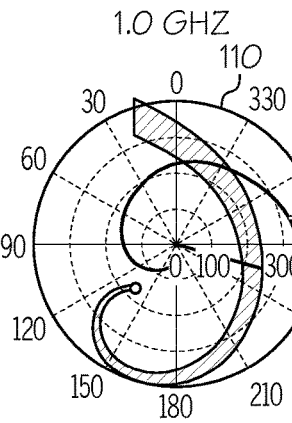
Figure 8C:
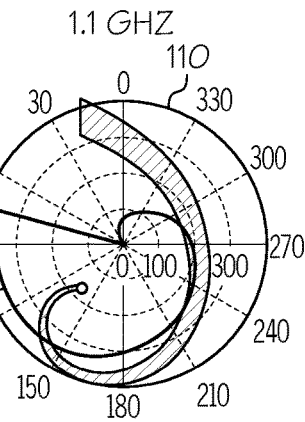
Figure 8D:
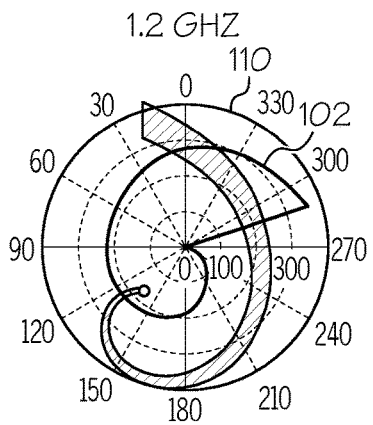
Figure 8E:
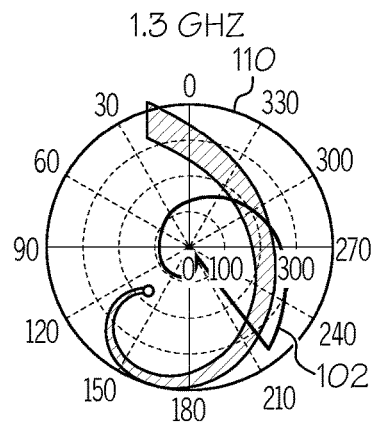
Figure 8F:
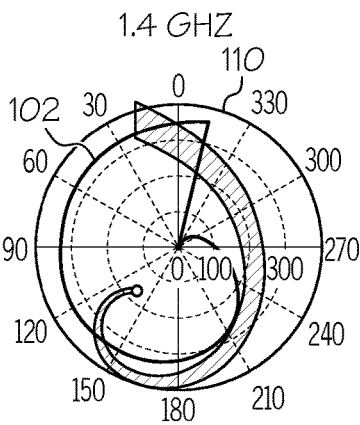
Figure 8G:
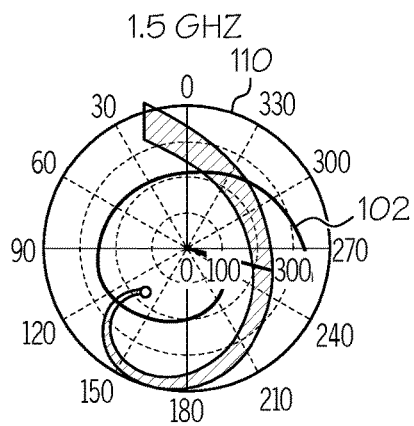
Figure 9A:
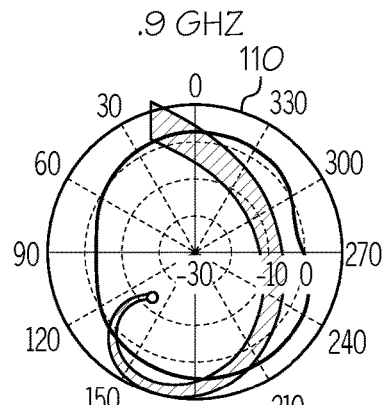
FIGS. 9A-9G illustrate examples of a gain response of the antenna at different frequencies.
Figure 9B:
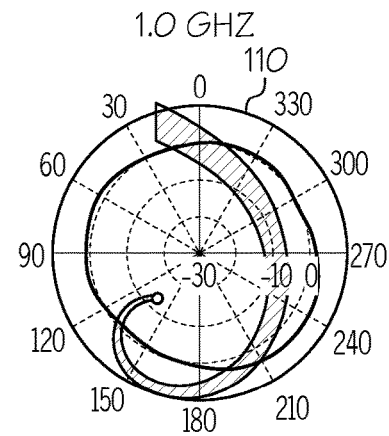
Figure 9C:
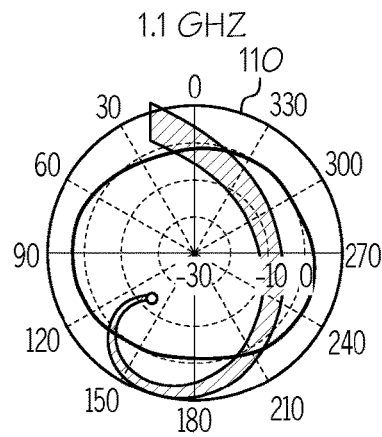
Figure 9D:
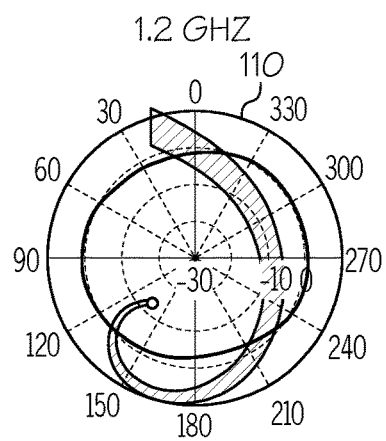
Figure 9E:
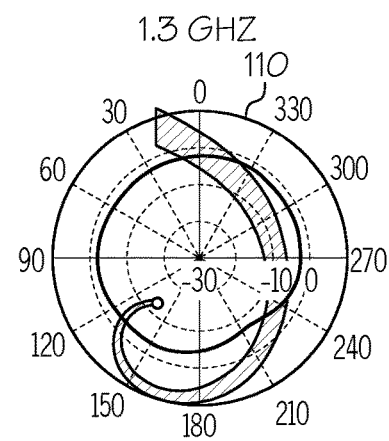
Figure 9F:
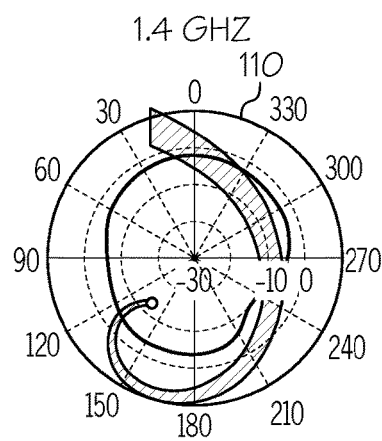
Figure 9G:
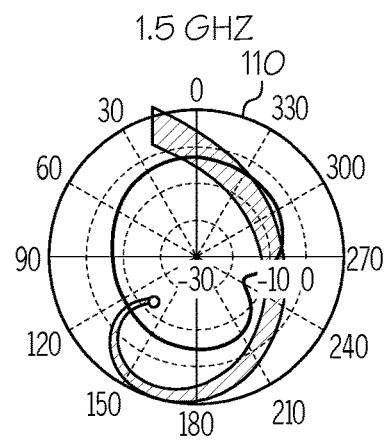

FIG. 7 illustrates another example of the antenna 100, In this example, the variable, angular-based phase shift is electronically produced by the antenna 100. For example, an electronic device of the antenna 100 is configured to change the phase of the incoming electromagnetic signal to cause the unique phase shift that varies based on the angular position of the direction of propagation of the electromagnetic radiation 106 relative to azimuth 110.

In one or more examples, the antenna structure 104 includes the array 118 of the antenna elements 120. In the illustrated example, the array 118 includes eight (8) antenna elements 120, identified individually as first antenna element 120-0, second antenna element 120-1, third antenna element 120-2, fourth antenna element 120-3, fifth antenna element 120-4, sixth antenna element 120-5, seventh antenna element 120-6, and eighth antenna element 120-7. However, in other examples, the array 118 may include any number of antenna elements 102-$n$. For N number of antenna elements 120-$n$, the nth antenna element 120 is 0 to N−1.

The number N of antenna elements 120 of the array 118 may depend on various factors, such as, but not limited to, the wavelength of the electromagnetic radiation 106 being received by the antenna 100, the number of angles or sectors of angles relative to azimuth 110 desired for direction finding, and the like.

In one or more examples, the antenna structure 104 also includes phase shifters 124 that are coupled to the antenna elements 120. Each one of the phase shifters 124 is coupled to and received a signal from an associated one of the antenna elements 120. In the illustrated example, the array 118 includes eight (8) phase shifters 124, identified individually as first phase shifter 124-0, second phase shifter 124-1, third phase shifter 124-2, fourth phase shifter 124-3, fifth phase shifter 124-4, sixth phase shifter 124-5, seventh phase shifter 124-6, and eighth phase shifter 124-7. However, in other examples, the array 118 may include any number of phase shifter 124-$n$. For N number of phase shifter 124-$n$, the nth phase shifter 124 is 0 to N−1.

In one or more examples, the antenna elements 120 are arranged is a shape of a circle. For example, each one of the antenna elements 120 is positioned at the same radial distance from the common feedpoint 134.

In one or more examples, each one of the phase shifters 124 is configured to cause a unique (e.g., predetermined) phase shift in the signal produced by an associated one of the antenna elements 120 based on the mathematical logarithmic spiral. For example, each one of the phase shifters 124 is configured to take the input signal from an associated one of the antenna elements 120 and add a small amount of delay to it to create a phase delay or distortion in the signal based on the angular position of the direction of propagation of the electromagnetic radiation 106 relative to azimuth 110.

In one or more examples, each one of the antenna elements 120 is angularly positioned at θn, where θ is the angular position of the antenna element 120-$n$ relative to azimuth 110. For example, the second antenna element 120-1 is angularly positioned at θ1, the third antenna element 120-2 is angularly positioned at θ2, etc., as shown in FIG. 7.

Each one of the phase shifters 124 is configured to produce a unique phase shift ϕn, where ϕ is the phase shift induced by the antenna element 120-$n$. ϕn is equal to 2nπ/N. For example, the second phase shifter 124-1 produces a unique phase shift of 2π/N, the third phase shifter 124-2 produces a unique phase shift of 4π/N, etc., as shown in FIG. 7.

In one or more examples, each one of the antenna elements 120 is coupled to and is in communication with the feedpoint 134 by an associated one of the feedlines 136. In the illustrated example, the eight (8) antenna elements 120 each have an associated feedline 136, identified individually as first feedline 136-0, second feedline 136-1, third feedline 136-2, fourth feedline 136-3, fifth feedline 136-4, sixth feedline 136-5, seventh feedline 136-6, and eighth feedline 136-7. However, in other examples, the array 118 may include any number of feedlines 136-$n$. For N number of feedlines 136-$n$, the nth feedline 136-$n$ is 0 to N−1.

In one or more examples, each one of the feedlines 136 has the same (e.g., fixed) line length.

As such, the unique phase shift produced by any one of the pair sets of the antenna element 120 and the phase shifter 124 of the array 118 is created by electronically shifting the phase of the electromagnetic signal and the fixed line length of the feedline 136.

In one or more examples, the antenna 100 (e.g., antenna structure 104) is linearly polarized. For example, the antenna 100 is vertically polarized or horizontally polarized. As an example, the antenna structure 104 includes a vertically oriented or a horizontally oriented dipole antenna (e.g., as shown in FIGS. 3-5). As another example, the antenna structure 104 includes a vertically oriented or a horizontally oriented array 118 of antenna elements 120 (e.g., as shown in FIGS. 6 and 7).

In one or more examples, the antenna 100 (e.g., antenna structure 104) is dual polarized. As an example, the antenna structure 104 includes a circularly polarized omnidirectional dipole antenna (e.g., as shown in FIGS. 3-5), with circular polarization achieved by addition of a polarization filter. As another example, the antenna structure 104 includes a circularly polarized omnidirectional array 118 of antenna elements 120 (e.g., as shown in FIGS. 6 and 7).

In one or more examples, the antenna structure 104 has a longitudinal axis A (e.g., as shown in FIG. 1). The antenna structure 104 is rotatable about the longitudinal axis A. Selective rotation of the antenna structure 104 about the longitudinal axis A provides a phase correction. In one or more examples, the phase shift is physically introduced by the angular characteristic structure of the geometry about the longitudinal axis A. Rotation of the antenna 100 (e.g., pre-calibrated or determined a prior) can provide reference phase change information that can be stored in a lookup table as a function of the incoming angle.

FIGS. 8A-8G are graphical illustrations of examples of an azimuth polar phase pattern (e.g., the variable phase response 102) of the antenna 100 at different frequencies of the electromagnetic radiation 106. As illustrated, at each angular position relative to azimuth 110, the phase response produced by the antenna 100 is unique and is different relative to any other angular position relative to azimuth 110.

FIGS. 9A-9G are graphical illustrations of examples of an azimuth polar gain pattern (e.g., gain response) of the antenna 100 at different frequencies of the electromagnetic radiation 106. As illustrated, the antenna 100 is omnidirectional and the gain response produced by the antenna 100 is approximately the same (or is within an acceptable tolerance) at each angular position relative to azimuth 110.

In one or more examples, the antenna 100 is a receive antenna, such as for direction-finding applications (e.g., as part of the angle-of-arrival sensor 200 shown in FIGS. 1 and 10-13). In one or more examples, the antenna 100 is also a transmit antenna, such as for phase modulation or beam processing.

Referring generally to FIGS. 1 and 10-13, by way of examples, the present disclosure is also directed to the angle-of-arrival ("AOA") sensor 200. In one or more examples, the angle-of-arrival sensor 200 uses the antenna 100 to determine the angle of arrival of the electromagnetic radiation 106. Generally, the angle-of-arrival sensor 200 includes two antennas, for example, one being a spiral cross-section dipole and the other being a cylindrical dipole. The phase of the spiral cross-section dipole varies with the angle of incidence. The phase of the cylindrical dipole does not vary with the angle of incidence. The angle of arrival of incoming electromagnetic energy can be determined based on a comparison of the phase responses of the two antennas.

In one or more examples, the two antennas are stacked close together, such that they both receive incoming electromagnetic signals (e.g., near horizon) at approximately the same time. The phase of the two received signals can be compared and the difference can be used to compute the angle of arrival.

In one or more examples, the angle-of-arrival sensor 200 is used for direction finding electromagnetic signals. As an example, the angle-of-arrival sensor 200 is used for determining the angle-of-arrival (or direction-of-arrival) of incoming electromagnetic radiation (e.g., radio waves). Unlike conventional direction-finding systems, the disclosed angle-of-arrival sensor 200 provides direction finding with a high degree of accuracy in a compact form.

For example, rather than relying on an array of antennas mounted far apart, as with conventional systems for determining the angle of arrival of incoming electromagnetic waves, the disclosed angle-of-arrival sensor 200 uses the antenna 100, which produces an angular-based phase shift in the received electromagnetic signal, and a second antenna 202, which is closely located to the antenna 100 and which does not produce a phase shift in the received electromagnetic signal. Thus, by comparing the received signals from the antenna 100 and the second antenna 202, the angle-of-arrival sensor 200 can determine the angle of arrival based on the difference between the shifted phase and the unshifted phase. Due to the structural configurations of the antenna 100 and the second antenna 202, the antenna 100 and the second antenna 202 can be placed relatively close to each other to minimize phase measurement error. In conventional direction-finding systems, a larger spacing between antennas (e.g., multiple antennas in an array) may be needed to determine phase differences between received signals.

Figure 10:
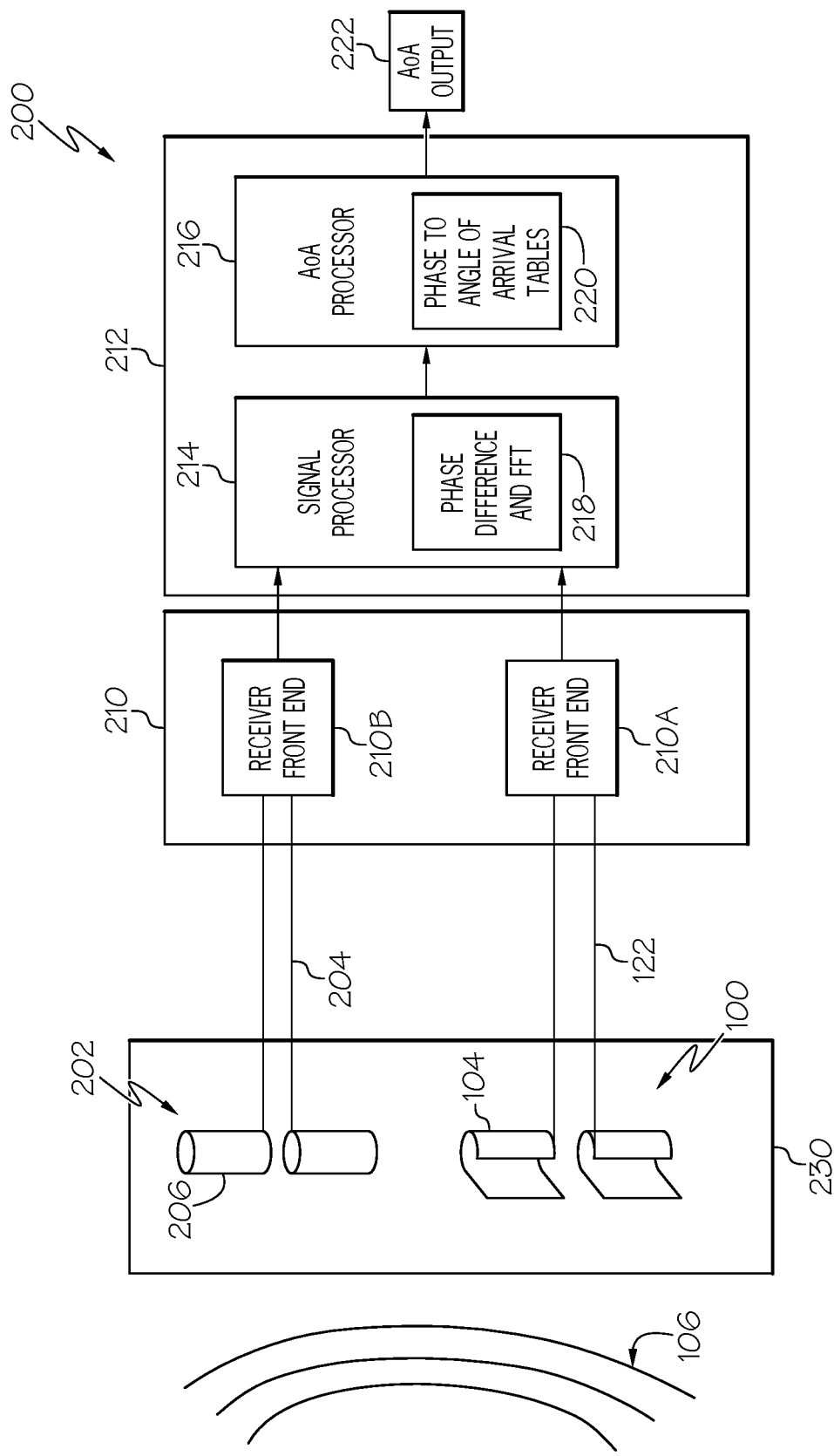
FIG. 10 is a schematic illustration of an example of the angle-of-arrival sensor using the antenna shown in FIGS. 3-5.
Figure 11:
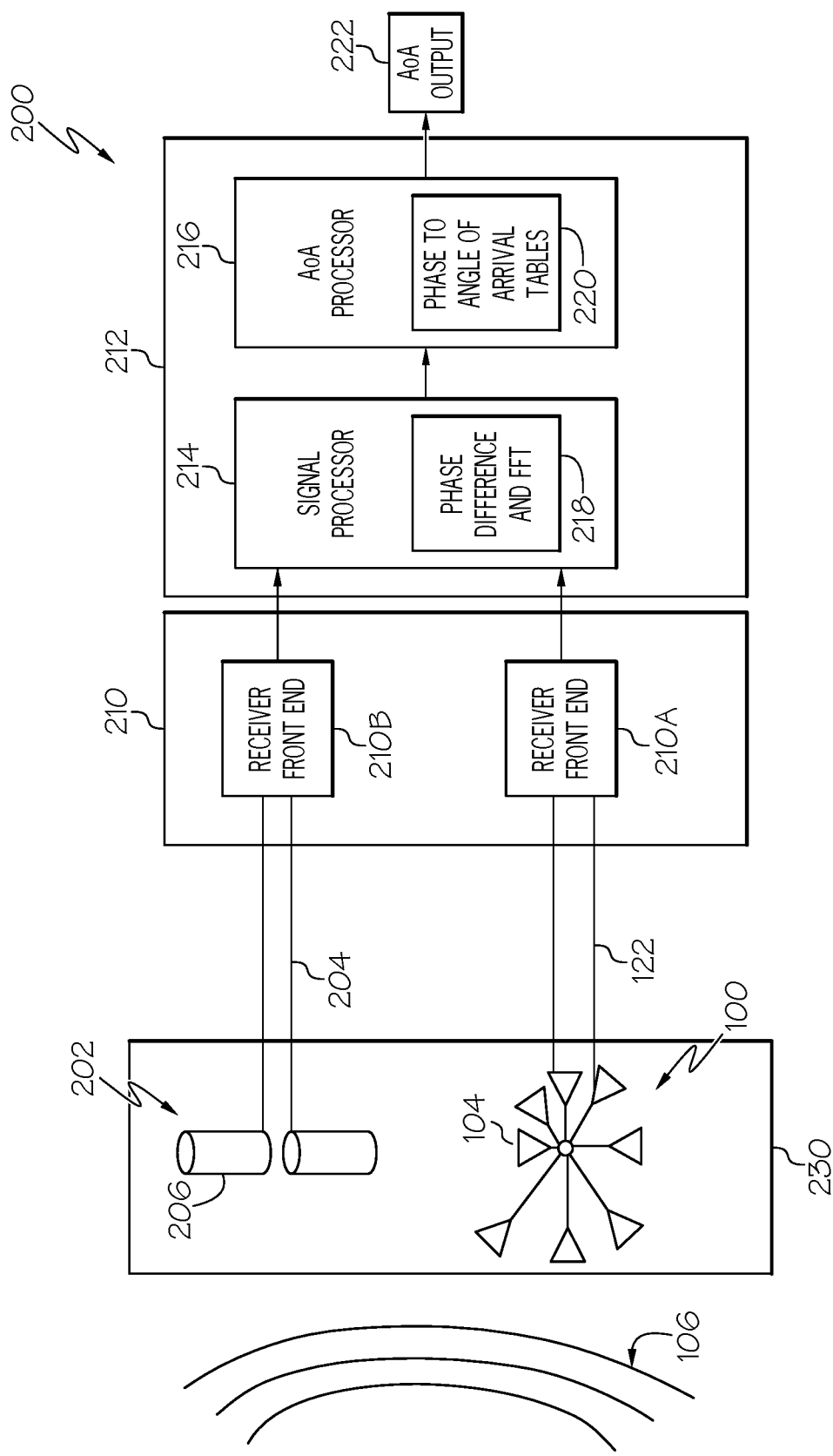
FIG. 11 is a schematic illustration of an example of the angle-of-arrival sensor using the antenna shown in FIG. 6.
Figure 12:
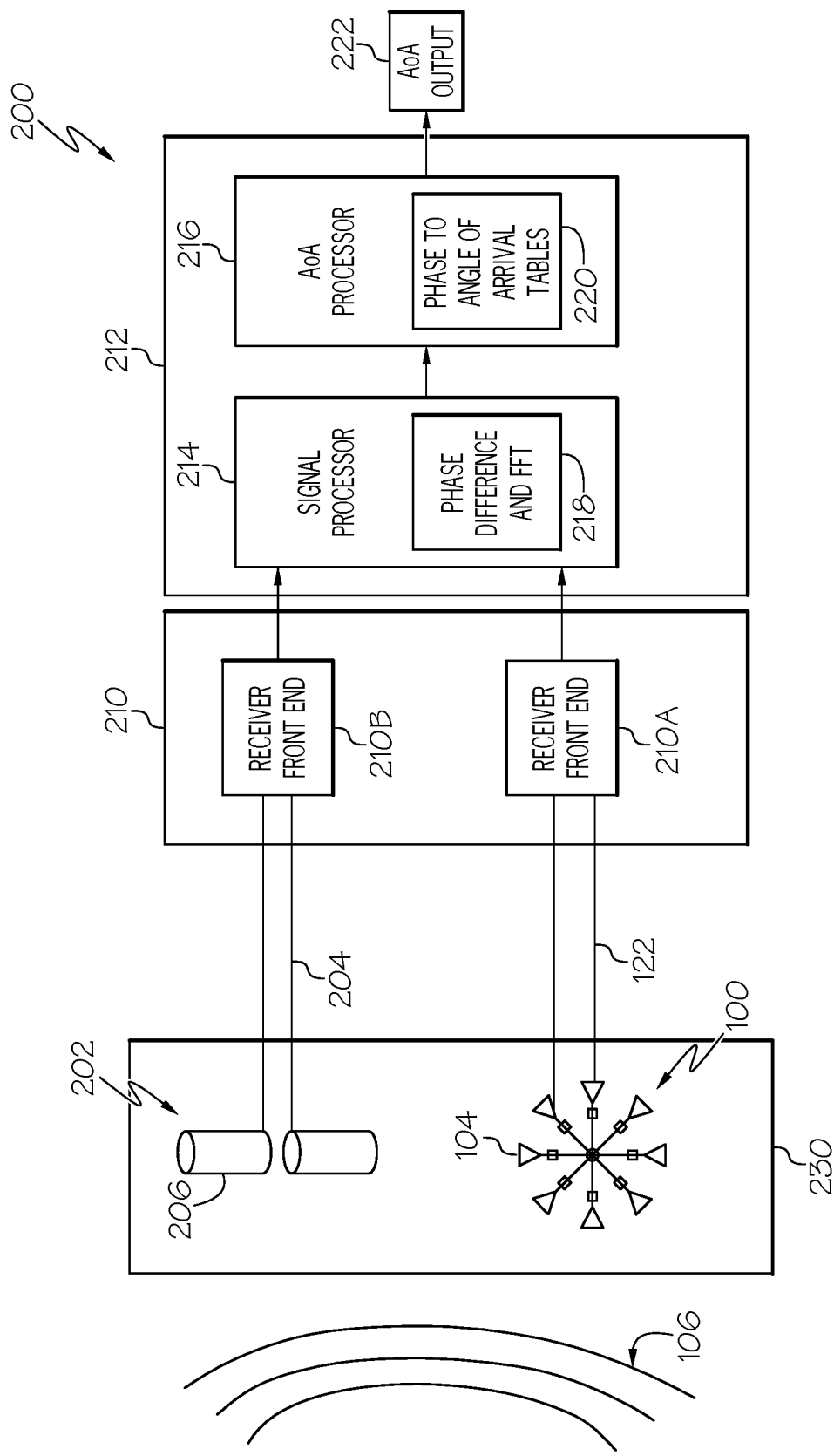
FIG. 12 is a schematic illustration of an example of the angle-of-arrival sensor using the antenna shown in FIG. 7.
Figure 13:
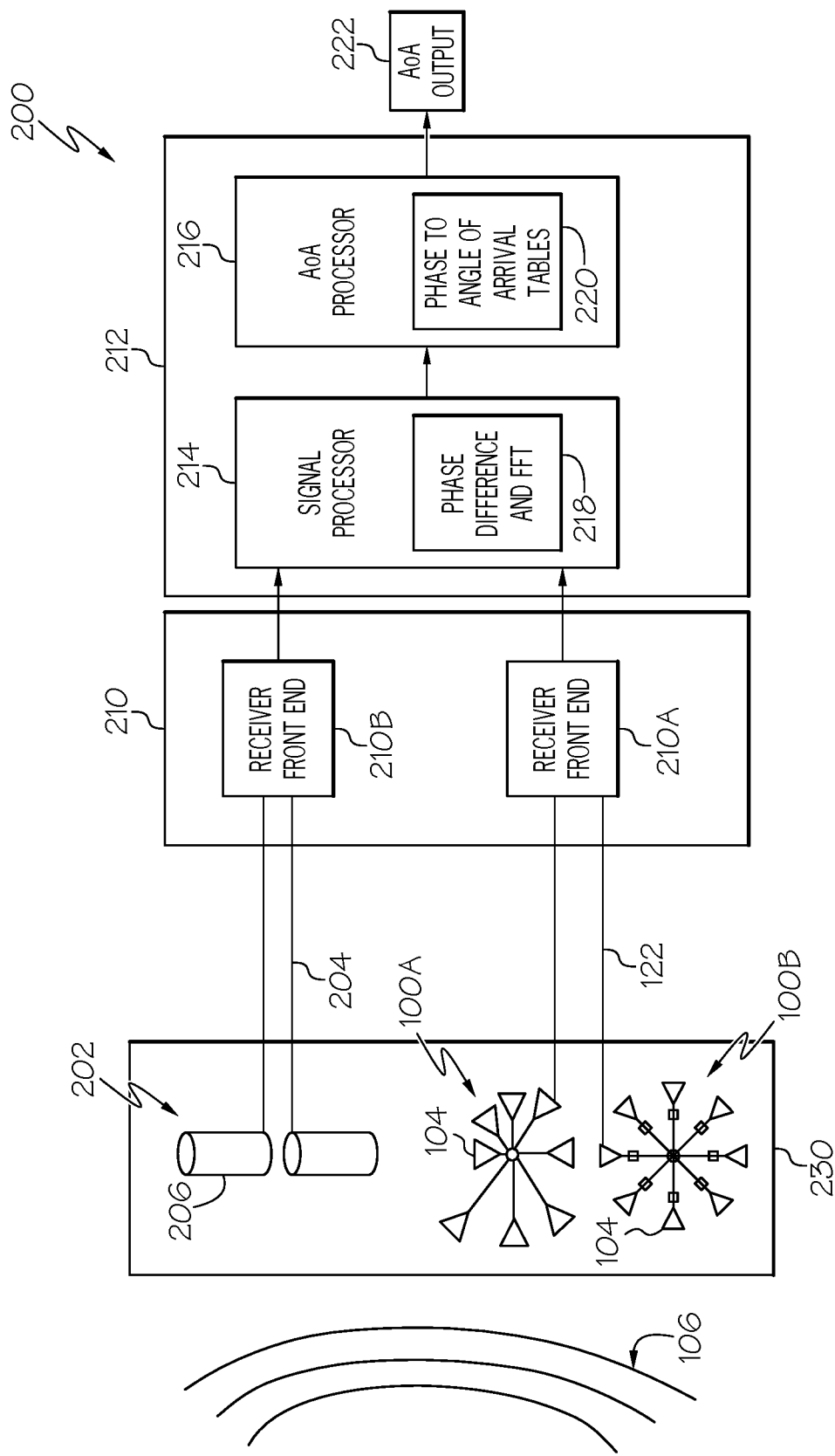
FIG. 13 is a schematic illustration of an example of the angle-of-arrival sensor using the antenna shown in FIG. 6 and the antenna shown in FIG. 7.

FIGS. 10-13 illustrate examples of the angle-of-arrival sensor 200. In one or more examples, the angle-of-arrival sensor 200 includes the antenna 100, such as the antenna 100 shown in FIGS. 3-5 (e.g., as shown in FIG. 10), the antenna 100 shown in FIG. 6 (e.g., as shown in FIG. 11), or the antenna 100 shown in FIG. 7 (e.g., as shown in FIG. 12). In one or more examples, the angle-of-arrival sensor 200 may include two antennas 100, such as the as the antenna 100 shown in FIGS. 3-5 or the antenna 100 shown in FIG. 6 and the antenna 100 shown in FIG. 7 (e.g., as shown in FIG. 13).

The antenna 100 is configured to receive the electromagnetic radiation 106 and to produce a phase-shift signal 122. The antenna 100 includes the antenna structure 104 that is configured to cause the variable phase shift in the electromagnetic radiation 106 according to the mathematical logarithmic spiral based on the angular position of the direction of propagation of the electromagnetic radiation 106 relative to azimuth 110.

In one or more examples, the angle-of-arrival sensor 200 includes a second antenna 202. The second antenna 202 is configured to receive the electromagnetic radiation 106 and to produce a phase-reference signal 204.

In the examples of the angle-of-arrival sensor 200 described herein and illustrated in FIGS. 10-13, the antenna 100 may also be referred to as a first antenna.

In one or more examples, both the antenna 100 and the second antenna 202 may be configured to separately receive incoming electromagnetic energy (e.g., the electromagnetic radiation 106). The antenna 100 (e.g., first antenna) produced the unique, angular-based phase shift in the electromagnetic signal. The second antenna 202 is used as a phase reference by which to compare signals received by the antenna 100.

In one or more examples, the antenna 100 and the second antenna 202 have different antenna geometries (e.g., are antennas with different geometries).

Referring to FIG. 10, in one or more examples, the antenna 100 having the antenna structure 104 includes an antenna geometry 108 that is configured to cause the unique phase shift in the electromagnetic radiation 106. In one or more examples, the antenna geometry 108 is a spiral. In one or more examples, the antenna geometry 108 is a logarithmic spiral (e.g., the logarithmic spiral 128 shown in FIG. 2). In one or more examples, the antenna structure 104 includes the antenna body 112 with the receiving surface 114 (e.g., as shown in FIGS. 3-5).

Referring to FIG. 11, in one or more examples, the antenna 100 having the antenna structure 104 includes the array 118 of the antenna elements 120. In one or more examples, the array 118 of the antenna elements 120 forms the antenna geometry 108. The antenna elements 120 are arranged in a shape of a logarithmic spiral (e.g., as shown in FIG. 6). Each one of the antenna elements 120 is positioned to cause a unique (e.g., predetermined) phase shift in a signal produced by the antenna elements 120 based on the mathematical logarithmic spiral.

Referring to FIG. 12, in one or more examples, the antenna 100 having the antenna structure 104 includes the array 118 of the antenna elements 120 and phase shifters 124 that are coupled to the antenna elements 120. In one or more examples, the antenna elements 120 are arranged is a shape of a circle. In one or more examples, each one of the phase shifters 124 is configured to cause a unique (e.g., predetermined) phase shift in a signal produced by an associated one of the antenna elements 120 based on the mathematical logarithmic spiral.

Referring to FIGS. 10-13, in one or more examples, the second antenna 202 includes a second antenna structure 206. The second antenna structure 206 includes a second antenna geometry 208. The second antenna geometry 208 of the second antenna structure 206 is different than the antenna geometry 108 of the antenna 100. In one or more examples, the second antenna geometry 208 is circular. However, in other examples, the second antenna structure 206 may be other types of antennas or have other antenna geometries.

Referring to FIG. 13, in one or more examples, the angle-of-arrival sensor 200 includes two antennas 100, each having a different antenna structure 104. For example, a first one of the two antennas 100 (e.g., antenna 100A) includes the antenna elements 120 arranged in a shape of a logarithmic spiral (e.g., as shown in FIG. 6) and each one of the antenna elements 120 is positioned to cause a unique phase shift in the signal produced by the antenna elements 120 based on the mathematical logarithmic spiral. A second one of the two antennas 100 (e.g., antenna 100B) includes the antenna elements 120 arranged is a shape of a circle and the phase shifters 124 configured to cause a unique phase shift in the signal produced by an associated one of the antenna elements 120 based on the mathematical logarithmic spiral.

In this example, the combination of antenna 100A and 100B enables the angle-of-arrival sensor 200 to produce a "coarse grain" direction finding, for example, based on amplitude, and then a "fine grain" direction finding based on phase. This example may reduce the number of antennas required for fine grain direction finding.

In one or more examples, it may be desirable for both the antenna 100 and the second antenna 202 to have the same (or substantially similar) gain performance over a desired field of view. In one or more examples, it may be desirable for both the antenna 100 and the second antenna 202 to have an omnidirectional radiation pattern with good gain over a wide range of elevation angles (e.g., approximately 80 degrees for a dipole), and a wide bandwidth, and therefore may be used for direction of arrival in all azimuthal directions over a range of useful elevation angles about the horizon.

In one or more examples, based on a desired use case, the frequencies over which the antenna 100 and the second antenna 202 operate may vary. As an example, the antenna 100 and the second antenna 202 may be configured to receive signals having frequencies between 8 gigahertz (GHz) and 12 GHz. As another example, the antenna 100 and the second antenna 202 may be configured to receive signals having frequencies between 0.9 gigahertz (GHz) and 1.5 GHz. In other examples, different frequency bands may be used as well, depending on the types of radio waves the angle-of-arrival sensor 200 is designed to receive.

Referring now to FIGS. 10-13, in one or more examples, the angle-of-arrival sensor 200 includes a radio receiver 210. The receiver 210 is configured to receive the phase-shift signal 122 from the antenna 100 and the phase-reference signal 204 from the second antenna 202.

In one or more examples, the receiver 210 includes a first receiver front end 210A and a second receiver front end 210B. The antenna 100 is couped to and provides the phase-shift signal 122 to the first receiver front end 210A. The second antenna 202 is couped to and provides the phase-reference signal 204 to the second receiver front end 210B.

In one or more examples, the first receiver front end 210A and the second receiver front end 210B may be configured to down convert signals received by the respective antennas. For example, the antenna 100 and the second antenna 202 may be configured to receive signals having frequencies between 8 GHz and 12 GHz and the respective receiver front ends may down-convert the received signals to a lower frequency and/or baseband for further processing. Although the first receiver front end 210A and the second receiver front end 210B are shown as two different components, in some examples, they may be integrated together as a single component, possibly with other components integrated as well (e.g., such as a signal processor and/or an angle-of-arrival processor).

In one or more examples, the angle-of-arrival sensor 200 includes a processor 212. The processor 212 is configured to determine the angle of arrival of the electromagnetic radiation 106 based on a comparison of the phase-shift signal 122 and phase-reference signal 204.

In one or more examples, the processor 212 includes a signal processor 214 and an angle-of-arrival (AOA) processor 216.

In one or more examples, the signal processor 214 is configured to determine a phase difference, an amplitude difference, and/or perform a Fast Fourier Transform (FFT) (e.g., block 218) on the down converted or baseband signals from the respective first receiver front end 210A and second receiver front end 210B. In one or more examples, the signal processor 214 may include processing to determine not only angle of arrival of the signal, but direction and speed of the source of the signal, for example, through Doppler frequency shift analysis of the FFT-transformed time domain signal.

In one or more example, an output of the signal processor 214 is fed into the angle-of-arrival processor 216. The angle-of-arrival processor 216 is configured to receive the output of the signal processor 214 and to generate an angle-of-arrival (AOA) estimate output 222.

In one or more examples, the angle-of-arrival estimate output 222 may be used by other systems. For example, an alert system may alert a pilot of the angle-of-arrival estimate output 222, so the pilot knows the direction from which incoming electromagnetic signals are coming.

Referring to FIGS. 1 and 10-13, the processor 212, such as the angle-of-arrival processor 216, may include any suitable computing device. For example, the processor 212 may a single computing device or several interconnected computing devices. Generally, the processor 212 may include any collection of computing devices that individually or jointly execute a set (or multiple sets) of instructions to implement any one or more of the operations discussed herein. For example, the processor 212, such as the angle-of-arrival processor 216, may include a processing unit 224 (e.g., at least one processing unit) that is coupled to memory 226. The memory 226 includes program code 228 that is executable by the processing unit 224 to perform one or more operations.

Generally, as used herein, phrases such as a computing device or a processor being configured or adapted to refers to the computing device or processor (e.g., processor 212) being configured or otherwise operable to perform a function, such as the program code 228 being executed by the processing unit 224 to perform a desired operation or function. The program code 228 is any coded instructions that is (e.g., computer readable and/or machine readable. The memory 226 is any a non-transitory computer readable and/or machine readable medium, such as a hard disk drive, flash memory, read-only memory, a compact disk, a digital versatile disk, a cache, random-access memory, and/or any other storage device or storage disk in which information is stored for any duration (e.g., for extended time periods, permanently, for brief instances, for temporarily buffering, and/or for caching of the information).

In one or more examples, the angle-of-arrival processor 216 is adapted to read data from a data storage device (e.g., memory 226). In one or more examples, the data storage device includes information about the angular-based phase shifts (e.g., phase offsets or phase distortions) caused (e.g., induced or produced) by the antenna 100. The angle-of-arrival processor 216 uses this data and perform a correlation on the received phase-shift signal 122 from the antenna 100 and the phase-reference signal 204 from the second antenna 202 to determine the angle at which the incoming electromagnetic energy (e.g., electromagnetic radiation 106) was received by the antenna 100.

In one or more examples, information about the angular-based phase shifts takes the form of a lookup table 220, for example, stored on the memory 226. The lookup table 220 includes information about the angular positions of the antenna 100 and the associated phase shifts. For example, the lookup table 220 includes phase to angle of arrival tables.

In one or more examples, the processor 212 determines a phase difference between the shifted phase of the electromagnetic energy received by the antenna 100 and the reference phase of the electromagnetic energy received by the second antenna 202 to determine a phase offset. The phase offset may be based on an angle-dependent phase distortion induced by the antenna 100.

In one or more examples, the angle-of-arrival processor 216 uses data about the signal received by the second antenna 202 as a reference signal. The angle-of-arrival processor 216 may compare a relative phase difference between the phase-shift signal 122 received by the antenna 100 and the phase-reference signal 204 received by the second antenna 202. The angle-of-arrival processor 216 may responsively use this relative phase information, combined with the data in the data storage device to determine the angle of arrival (e.g., the angle-of-arrival output 222).

In one or more examples, rather than using relative phase information, the angle-of-arrival processor 216 may use relative amplitude information. In this instance, rather than causing a phase shift or distortion, the antenna 100 may be configured to provide an amplitude shift or distortion based on the angle of arrival. In other examples, the antenna 100 may provide both phase and amplitude distortions and the angle-of-arrival processor 216 may use both phase and amplitude information from the antenna 100 and the second antenna 202 to determine the angle of arrival.

In one or more examples, both the functionality of the signal processor 214 and the angle-of-arrival processor 216 may be performed by the same general purpose computing processor (e.g., processor 212) executing instructions to perform the given functions. In other examples, the signal processor 214 and the angle-of-arrival processor 216 may be separate processors. For example, both the signal processor 214 and the angle-of-arrival processor 216 may be custom processors, such as application-specific integrated circuit (ASIC) processors.

Referring again to FIGS. 10-13, in one or more examples, the angle-of-arrival sensor 200 includes a radome 230. The radome 230 is located and shaped to surround the antenna 100 and the second antenna 202, for example, in a receiving pathway of the antenna 100 and the second antenna 202 where at least a majority of the incoming electromagnetic radiation 106 passes through the radome 230 before being receive by the antenna 100 and the second antenna 202.

The radome 230 may have any suitable shape or three-dimensional geometry, for example, based on the antenna structure 104 of the antenna 100 and the second antenna structure 206 of the second antenna 202. As an example, the radome 230 may have a hollow cylindrical shape within which the antenna 100 and the second antenna 202 are located. As another example, the radome 230 may have a hollow semi-spherical shape within which the antenna 100 and the second antenna 202 are located. As another example, the radome 230 may have a flat (e.g., planar) shape that covers the antenna 100 and the second antenna 202. As yet another example, the radome 230 may have a dome shape that covers the antenna 100 and the second antenna 202. Other shapes are also contemplated for the radome 230.

In other examples, the angle-of-arrival sensor 200 may include two radomes 230, each one of the radomes 230 covering or surrounding a respective one of the antenna 100 and the second antenna 202.

Generally, the radome 230 is designed to not introduce any distortions in the incoming electromagnetic radiation 106.

In one or more examples, the radome 230 may be designed to provide additional enhancements by incorporating filtering or windowing in radome 230 to further shape, direct, reflect, or filter incoming electromagnetic signals. Polarizer filters, passband/stopband filters, and radome windowing are also contemplated.

Figure 14:
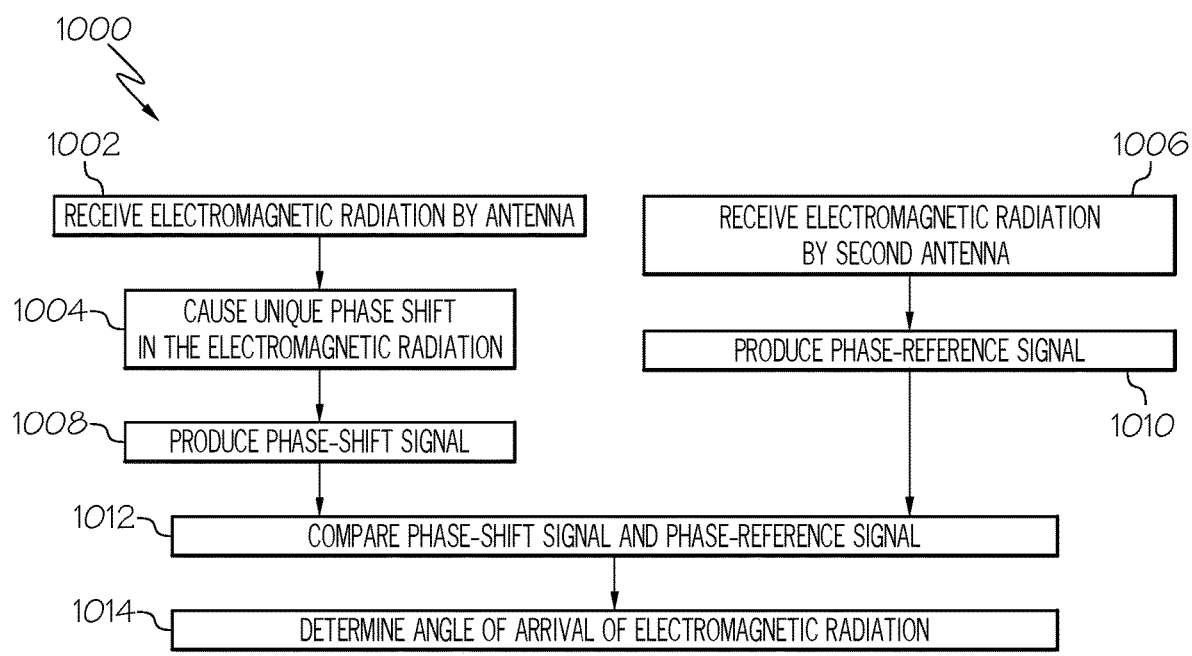
FIG. 14 is a flow diagram of an example of a method for determining an angle of arrival of electromagnetic radiation.

Referring generally to FIGS. 1-13 and particularly to FIG. 14, by way of examples, the present disclosure is also directed to a method 1000 for determining the angle of arrival of the electromagnetic radiation 106. In one or more examples, implementations of the method 1000 use examples of the angle-of-arrival sensor 200.

In one or more examples, the method 1000 includes a step of (block 1002) receiving the electromagnetic radiation 106 by the antenna 100.

In one or more examples, the method 1000 includes a step of (block 1004) causing a unique (e.g., predetermined) phase shift in the electromagnetic radiation 106 according to the mathematical logarithmic spiral based on the angular position of the direction of propagation of the electromagnetic radiation 106 relative to azimuth 110 using a configuration of the antenna structure 104 of the antenna 100.

In one or more examples, the method 1000 includes a step of (block 1006) receiving the electromagnetic radiation 106 by the second antenna 202.

In one or more examples, the antenna 100 and the second antenna 202 separately receive the electromagnetic radiation 106. In one or more examples, the step of (block 1002) receiving the electromagnetic radiation 106 by the antenna 100 and step of (block 1006) receiving the electromagnetic radiation 106 by the second antenna 202 occur concurrently.

In one or more examples, the method 1000 includes a step of (block 1008) producing the phase-shift signal 122 from the antenna 100. As expressed above, the phase-shift signal 122 from the antenna 100 represents a unique, angular-based phase shift in the electromagnetic radiation 106 caused (e.g., induced or produced) by the antenna 100.

In one or more examples, the phase (e.g., the unique phase shift) of the electromagnetic radiation 106 received by the antenna 100 increases from 0-degrees to 360-degrees, as the azimuthal angle of incidence increases from 0-degrees to 360-degrees. In one or more examples, the amplitude of the electromagnetic radiation does not vary in this manner.

In one or more examples, the method 1000 includes a step of (block 1010) producing the phase-reference signal 204 from the second antenna 202.

In one or more examples, the method 1000 includes a step of (block 1012) comparing the phase-shift signal 122 and the phase-reference signal 204.

In one or more examples, according to the method 1000, the step of (block 1012) comparing the phase-shift signal 122 and the phase-reference signal 204 includes a step of determining a phase difference between the phase-shift signal 122 and the phase-reference signal 204.

In one or more examples, the method 1000 includes a step of (block 1014) determining the angle of arrival of the electromagnetic radiation 106 based on a comparison of the phase-shift signal 122 and the phase-reference signal 204.

In one or more examples, according to the method 1000, the step of (block 1014) determining the angle of arrival of the electromagnetic radiation 106 includes a step of determining an angle-dependent phase shift introduced by the antenna structure 104 from the phase difference.

In one or more examples, the step of (block 1014) determining the angle of arrival of the electromagnetic radiation 106 is performed by a processor, based on a comparison of a shifted phase of the electromagnetic radiation 106 received by the antenna 100 and a reference phase of the electromagnetic radiation 106 received by the second antenna 202. As described above, the processor may receive data representative of the signals received by the antenna 100 and the second antenna 202. The processor may use the data representative of the signals and stored data (e.g., the lookup table 220) related to the antenna 100 to determine an angle from which the electromagnetic radiation 106 was received.

The present disclosure recognizes that unique phase variation can be directly related to a cross-sectional shape of a dipole, and this relationship can be correlated to determine the angle of arrival of an electromagnetic signal or to modify the phase of the electromagnetic signal for selected angles of arrival. As such, angle of arrival is determined from a frequency and phase relationship. Applications of the antenna 100, the angle-of-arrival sensor 200, and the method 1000 may include, but are not limited to, direction finding, anti-jam, anti-spoof, targeting, and time/phase difference of arrival algorithms.

In a practical application, the angle-of-arrival sensor can provide omnidirectional direction-finding and range finding, for static and moving emitters, having a single unit that includes dual stacked antennas. In one or more examples, the angle-of-arrival sensor 200 may be mounted on an aircraft, for example, at a location with 360-degree field of view, such as the lower fuselage or vertical tail tip. This arrangement eliminates having separate direction-finding systems on each quadrant of the aircraft, which is typically how conventional direction-finding systems are configured. In other examples, the ang-of-arrival sensor 200 may be mounted on a building, tower, space vehicle, maritime vehicle, or ground vehicle. The angle-of-arrival sensor 200 may be able to determine the angular location of incoming electromagnetic energy. In some examples, the incoming electromagnetic energy may be or include radar radio signals from another aircraft, spacecraft, maritime craft, or ground. Thus, the angle-of-arrival sensor 200 and method 1000 may serve as a direction-finding or direction-of-arrival system that aids in determining a direction to another aircraft.

In another practical application, the angle-of-arrival sensor 200 may be mounted on a vehicle, mobile device, or other structure at a location with field of view toward the sky. The angle-of-arrival sensor 200 may be able to determine the angular location of incoming electromagnetic energy. In some examples, the incoming electromagnetic energy may be or include signals from satellites used for global positioning. Thus, the angle-of-arrival sensor 200 and method 1000 may serve as a direction-finding or direction-of-arrival system that aids in determining that the signal is arriving from its expected direction and not from a false source.

In one or more examples, the antenna 100 (e.g., the phased antenna) and the second antenna 202 (e.g., the reference antenna) both transmit electromagnetic radiation 106 (e.g., an electromagnetic signal) to form a directional beacon, for example, transmitted from a ground station in a manner similar to a very high frequency omni-directional radio range (VOR) station. In one or more examples, the antenna 100 (e.g., the phased antenna) transmits on a single frequency (also referred to as a "tone") and the second antenna 202 (e.g., the reference antenna) transmits on an adjacent nearby single frequency. In another example practical application, an aircraft or a ground vehicle equipped with a standard non-phase shifted antenna and special receiver/processor can receive both signals and determine the phase difference, which would be correlated in a processor to an angular direction for that particular directional beacon. This example application may operate in substantially the same manner as a traditional VOR beacon, such as used in aviation, but advantageously uses different, simpler, cheaper antenna technology.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "a number of" refers to one or more items.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-13, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 11-13, referred to above, need be included in every example and not all elements, features, and/or components described herein are necessarily depicted in each illustrative example. Accordingly, some of the elements, features, and/or components described and illustrated in FIGS. 1-13 may be combined in various ways without the need to include other features described and illustrated in FIGS. 1-13, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-13, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-13, and such elements, features, and/or components may not be discussed in detail herein with reference to each of FIGS. 1-13. Similarly, all elements, features, and/or components may not be labeled in each of FIGS. 1-13, but reference numerals associated therewith may be utilized herein for consistency.

In FIG. 14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIG. 14 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the antenna 100, the angle-of-arrival sensor 200, and the method 1000 have been shown and described, modifications may occur to those skilled in the art upon reading the specification. The present application includes such modifications and is limited only by the scope of the claims.

What is claimed is:

1. An antenna configured to produce a variable phase response, the antenna comprising:
   a single antenna structure configured to receive electromagnetic radiation and comprising an antenna geometry,
   wherein the antenna geometry is configured to cause a variable phase shift in the electromagnetic radiation based on an angular position of a direction of propagation of the electromagnetic radiation relative to azimuth.

2. The antenna of claim 1, wherein the antenna geometry is radial in shape and a cross-sectional thickness of the antenna geometry varies in thickness along a radial length of the antenna geometry and causes a unique phase shift that varies based on the angular position of the direction of propagation of the electromagnetic radiation relative to azimuth.

3. The antenna of claim 1, wherein the antenna geometry is a spiral.

4. The antenna of claim 1, wherein:
   the antenna structure comprises an antenna body;
   the antenna body comprises a receiving surface;
   the receiving surface forms the antenna geometry; and
   the receiving surface comprises a shape of a radially expanding spiral curve.

5. The antenna of claim 4, wherein the radially expanding spiral curve is a logarithmic spiral.

6. The antenna of claim 4, wherein:
   the receiving surface has a radial length; and
   the radial length of the receiving surface is equal to one wavelength of the electromagnetic radiation.

7. The antenna of claim 6, wherein:
   the antenna body has a cross-sectional thickness; and
   the cross-sectional thickness of the antenna body varies along the radial length of the receiving surface.

8. The antenna of claim 1, wherein:
   the antenna structure has a longitudinal axis;
   the antenna structure is rotatable about the longitudinal axis; and
   selective rotation of the antenna structure about the longitudinal axis provides a phase correction.

9. The antenna of claim 1, wherein the antenna geometry is configured to cause the variable phase shift in the electromagnetic radiation according to a mathematical logarithmic spiral.

10. An angle-of-arrival sensor comprising:
    an antenna configured to receive electromagnetic radiation and to produce a phase-shift signal, wherein the antenna comprises an antenna structure that is configured to cause a variable phase shift in the electromagnetic radiation according to a mathematical logarithmic spiral based on an angular position of a direction of propagation of the electromagnetic radiation relative to azimuth;
    a second antenna configured to receive the electromagnetic radiation and to produce a phase-reference signal;
    a receiver configured to receive the phase-shift signal and the phase-reference signal; and
    a processor configured to determine an angle of arrival of the electromagnetic radiation based on a comparison of the phase-shift signal and phase-reference signal.

11. The angle-of-arrival sensor of claim 10, wherein the antenna structure comprises an antenna geometry that is configured to cause a unique phase shift in the electromagnetic radiation.

12. The angle-of-arrival sensor of claim 11, wherein the antenna geometry is a logarithmic spiral.

13. The angle-of-arrival sensor of claim 11, wherein the second antenna comprises a second antenna structure comprising a second antenna geometry that is different than the antenna geometry.

14. The angle-of-arrival sensor of claim 13, wherein the second antenna geometry is circular.

15. The angle-of-arrival sensor of claim 11, wherein:
    the antenna structure comprises an antenna body;
    the antenna body comprises a receiving surface;
    the receiving surface forms the antenna geometry; and
    the receiving surface comprises a shape of a logarithmic spiral.

16. The angle-of-arrival sensor of claim 15, wherein:
    the receiving surface has a radial length;
    the radial length of the receiving surface is equal to one wavelength of the electromagnetic radiation;
    the antenna body has a cross-sectional thickness; and
    the cross-sectional thickness of the antenna body varies along the radial length of the receiving surface.

17. The angle-of-arrival sensor of claim 11, wherein:
    the antenna structure comprises an array of antenna elements;
    the array of the antenna elements forms the antenna geometry; and
    the antenna elements are arranged in a shape of a logarithmic spiral.

18. The angle-of-arrival sensor of claim 11, wherein:
    the antenna structure comprises:
    an array of antenna elements; and
    phase shifters coupled to the antenna elements;
    the antenna elements are arranged is a shape of a circle; and
    each one of the phase shifters is configured to cause a unique phase shift in a signal produced by an associated one of the antenna elements based on the mathematical logarithmic spiral.

19. A method for determining an angle of arrival of electromagnetic radiation, the method comprising steps of:
    receiving the electromagnetic radiation by an antenna;

causing a unique phase shift in the electromagnetic radiation according to a mathematical logarithmic spiral based on an angular position of a direction of propagation of the electromagnetic radiation relative to azimuth using a configuration of an antenna structure of the antenna;

receiving the electromagnetic radiation by a second antenna;

producing a phase-shift signal from the antenna;

producing a phase-reference signal from the second antenna;

comparing the phase-shift signal and the phase-reference signal; and determining the angle of arrival of the electromagnetic radiation based on a comparison of the phase-shift signal and the phase-reference signal.

20. The method of claim 19, wherein:

the step of comparing the phase-shift signal and the phase-reference signal comprises determining a phase difference between the phase-shift signal and the phase-reference signal; and the step of determining the angle of arrival of the electromagnetic radiation comprises determining an angle-dependent phase shift introduced by the antenna structure from the phase difference.

* * * * *